United States Patent [19]
Nurishi et al.

[11] Patent Number: 6,141,157
[45] Date of Patent: Oct. 31, 2000

[54] ZOOM LENS

[75] Inventors: Ryuji Nurishi, Utsunomiya; Jun Hosoya, Yokohama, both of Japan

[73] Assignee: Canon Kabushiki Kaisha, Tokyo, Japan

[21] Appl. No.: 09/334,824

[22] Filed: Jun. 17, 1999

[30] Foreign Application Priority Data

Jun. 22, 1998 [JP] Japan ................................ 10-191074

[51] Int. Cl.[7] .................................................. G02B 15/14
[52] U.S. Cl. ........................................... 359/686; 359/688
[58] Field of Search .................................. 359/686, 687, 359/688, 683, 676

[56] References Cited

U.S. PATENT DOCUMENTS

| | | | |
|---|---|---|---|
| 5,748,384 | 5/1998 | Sensui | 359/686 |
| 5,786,942 | 7/1998 | Komori et al. | 359/686 |
| 5,872,658 | 2/1999 | Ori | 359/677 |
| 6,038,081 | 3/2000 | Sato | 359/676 |

*Primary Examiner*—Georgia Epps
*Assistant Examiner*—Jordan M. Schwartz
*Attorney, Agent, or Firm*—Robin, Blecker & Daley

[57] ABSTRACT

A zoom lens has, in succession from the object side, a first lens unit of positive refractive power fixed during focal length change, a second lens unit of negative refractive power for focal length change, a third lens unit of negative refractive power for correcting the fluctuation of the image plane resulting from focal length change, and a fixed fourth lens unit of positive refractive power, and a thin layer of resin satisfying a predetermined condition is provided on at least one lens surface of the first lens unit.

5 Claims, 15 Drawing Sheets fw (MAX. WIDE-ANGLE STATE)

$fm = fw \times Z^{1/4}$

F DROP POINT $$fd = ft \times \frac{FNo\ (MAX.\ WIDE\text{-}ANGLE\ STATE)}{FNo\ (MAX.\ TELEPHOTO\ STATE)}$$

ft (MAX. TELEPHOTO STATE)

ZOOM LENS

BACKGROUND OF THE INVENTION

1. Field of the Invention

This invention relates to a zoom lens, and particularly to a so-called four-unit zoom lens which appropriately uses a thin layer of resin in some lens surfaces in the lens system to thereby correct various aberrations well and which has a great aperture having F number of about 1.7 at the wide angle end and moreover has a wide angle of view (angle of view at the wide-angle end 2ω=58° to 70°) and has good optical performance over the entire variable power range of a variable power ratio (zooming ratio) as high as about 12 to 35 and which is thus suitable for a TV camera, a photographic camera, a video camera or the like.

2. Related Background Art

Zoom lenses having a great aperture, high variable power and moreover high optical performance have heretofore been required for TV cameras, photographic cameras, video cameras, etc.

In addition to this, particularly in color TV cameras for broadcasting, importance has been attached to operability and mobility, and in response to such requirement, a compact CCD (solid state image pickup device) of ⅔ inch or ½ inch has become the mainstream as an image pickup device.

In this CCD, the entire image pickup range has substantially uniform resolution and therefore, for a zoom lens using it, it is required that the various aberrations be well corrected from the center of the image field to the periphery of the image field and the resolution be substantially uniform.

For example, in a TV zoom lens, it is desired that of the various aberrations, particularly astigmatism, distortion and chromatic aberration of magnification be corrected well and the entire image field have high optical performance. It is further desired that the TV zoom lens have a great aperture, a wide angle of view and a high variable power ratio and moreover the entire lens system be compact and light in weight and have a long back focal length in order that a color resolving optical system and various filters may be disposed forwardly of image pickup means.

Of zoom lenses, a so-called four-unit zoom lens comprising, in succession from the object side, a first lens unit of positive refractive power for focusing, a second lens unit of negative refractive power for zooming, a third lens unit of positive or negative refractive power for correcting the image plane fluctuating with zooming, and a fourth lens unit of positive refractive power for imaging is relatively easy to give a high variable power ratio and a great aperture and therefore is often used as a zoom lens for a color TV camera for broadcasting.

Of four-unit zoom lenses, a four-unit zoom lens having F number of the order of 1.6 to 1.9, a great aperture ratio and high variable power of a variable power ratio of the order of 13 is proposed, for example, in Japanese Laid-Open Patent Application No. 54-127322.

In a zoom lens, to obtain a great aperture ratio (F number 1.7 to 1.8) and a high variable power ratio (variable power ratio 12 to 35) and a wide angle of view (angle of view at the wide angle end: 2ω=58° to 70°) and moreover high optical performance over the entire variable power range, it is necessary to appropriately set the refractive power and lens construction of each lens unit.

Generally, to obtain high optical performance in which aberration fluctuation is small over the entire variable power range, it becomes necessary to increase, for example, the number of lenses in each lens unit to thereby increase the degree of freedom in the design for aberration correction.

Therefore, if an attempt is made to achieve a zoom lens having a great aperture ratio and a wide angle as well as a high variable power ratio, the number of lenses is unavoidably increased and there arises the problem that the entire lens system becomes bulky and thus, it becomes impossible to meet the desire for compactness and light weight.

Regarding the wider angle of a zoom lens, the correction of chromatic aberration of magnification among the various aberrations affecting the imaging performance becomes the greatest point at issue. This is because chromatic aberration of magnification affects by the tangent of the angle of view in the area of a primary chromatic aberration coefficient.

FIGS. 14 to 17 of the accompanying drawings show the optical paths of a conventional four-unit zoom lens (focal length=8.5 mm at the wide angle end (maximum wide-angle state), variable power ratio=15 times) at the wide-angle end (maximum wide-angle state) to the telephoto end (maximum telephoto state) thereof. FIG. 14 shows the wide-angle end (focal length fw), FIG. 15 shows the medium focal length fm (=fw×$Z^{1/4}$) when the zoom ratio is Z, FIG. 16 shows the F drop focal length fd for which F number becomes reduced, and FIG. 17 shows the telephoto end.

Also, FIG. 13 of the accompanying drawings shows changes in the chromatic aberration of magnification of the same zoom lens resulting from a focal length change. In FIG. 13, there are shown four zoom positions, i.e., the wide-angle end (fw), the medium fm (fw×$Z^{1/4}$) the F drop focal length fd and the telephoto end ft. As shown in FIG. 13, chromatic aberration of magnification is great plus as the entire image field at the wide-angle end (focal length fw). From the wide-angle end fw toward the medium fm, the F drop focal length fd and the telephoto end (focal length ft), it sequentially changes in the direction of minus. At this time, chromatic aberration of magnification passes the 0 zoom position, and at the telephoto end, the value of minus becomes greatest as the entire image field. Also, the chromatic aberration of magnification at the wide-angle side has a curve-like change for the angle of view, and g-line changes toward the minus side in the vicinity of the maximum angle of view for e-line (reference wavelength).

Accordingly, if at the wide-angle side, chromatic aberration of magnification is balanced at a certain medium angle of view, the amount of separation of g-line will become great and become a blue flare component inside it, and the amount of separation of c-line will become great and become a red flare component outside it. This tendency becomes more remarkable when the downsizing, a wider angle and a higher magnification are aimed at, and it becomes difficult to obtain a substantially uniform image quality on the entire image field.

Description will now be made of the mechanism by which the above-described high-order chromatic aberration of magnification at the wide-angle side occurs.

As shown in FIG. 17, in a first lens unit F, an on-axis marginal ray R1 passes the highest position at the telephoto end and therefore, it is necessary to sufficiently suppress the creation of spherical aberration and on-axis chromatic aberration in the first lens unit F. Accordingly, in a high magnification zoom lens having an angle of view 2ω=58° to 70° at the wide-angle end and a variable power ratio of the order of 12 to 35, the first lens unit F generally adopts a construction in which a negative lens formed of a material having a small Abbe's number is disposed at the object side and a plurality of positive lenses including a material having a great Abbe's number and a great abnormal dispersing property are disposed at the image side.

As shown in FIGS. 14 and 15, at the wide-angle side, an off-axis light beam passes a high position in the first lens unit F, is jumped down by a negative lens G1, and is jumped up by positive lenses G2 to G5. The negative lens G1 is small in the Abbe's number of its material and therefore, the jump-down at the short wavelength side thereof suddenly increases in the vicinity of the most peripheral angle of view, whereas the positive lenses G2 to G5 are great in the Abbe's number of their materials and great in the abnormal dispersing property thereof and therefore, the jump-up at the short wavelength side is deficient. As the result, as shown in FIG. 13, at the wide-angle side, g-line appears in the vicinity of the most peripheral angle of view as high-order chromatic aberration of magnification suddenly changing to minus. If for downsizing, the refractive power of the first lens unit F is strengthened as a reduction system, this tendency will become more remarkable because the refractive power of the aforementioned negative lens and of the aforementioned positive lenses becomes stronger.

As means for mitigating such high-order chromatic aberration of magnification, it may be mentioned to add, in FIG. 14, a negative lens formed of a material great in Abbe's number to the vicinity of a positive lens G2 in which the incidence height h2 of an off-axial light beam is great to make it share achromatism, and suppress the creation of a high-order component. Also, if a negative lens formed of a material great in Abbe's number is added to the vicinity of positive lenses G2 to G5 having a focal length fm at the variable power ratio $Z^{1/4}$ of FIG. 5 and in which the incidence height h2 of the off-axial light beam suddenly increases, the jump-down by the aforementioned negative lens increases from the wide-angle end to the focal length fm at the variable power ratio $Z^{1/4}$ and therefore, in addition to the mitigation of the high-order component by the sharing of achromatism, the fluctuation of chromatic aberration of magnification from the wide-angle end to the focal length fm at the variable power ratio $Z^{1/4}$ toward the minus side and the fluctuation of distortion toward the plus side can be mitigated. Further, if the aforementioned negative lens added is formed into a meniscus shape concave toward the object side, high-order chromatic aberration of magnification can be corrected more effectively owing to the jump-up effect of the off-axial light beam by the image side convex surface of the aforementioned negative lens.

However, there has been the problem that the addition of the negative lens increases the full length of the first lens unit F and accordingly, increases the effective diameter of the first lens unit F, and this leads to the bulkiness of the zoom lens.

SUMMARY OF THE INVENTION

It is an object of the present invention to provide a so-called four-unit zoom lens in which the lens construction of a first lens unit is appropriately set and at least one lens surface of the first lens unit is appropriately provided with a thin layer of resin to thereby reduce the fluctuations of various aberrations resulting from focal length change without causing the bulkiness and increased weight of the zoom lens, and well correct high-order chromatic aberration of magnification particularly at the wide-angle side and which has high optical performance over the entire variable power range.

It is also an object of the present invention to provide a zoom lens having F number of the order of 1.7 at the wide-angle end and a wide angle (angle of view 2ω= about 58° to 70° at the wide-angle end) as well as a great aperture ratio and a high variable power ratio having a variable power ratio of the order of 12 to 35.

The zoom lens of the present invention is a zoom lens having, in succession from the object side, a first lens unit of positive refractive power fixed during zooming, a second lens unit of negative refractive power for zooming, a third lens unit for correcting fluctuations of the image plane resulting from the zooming, and a fixed fourth lens unit of positive refractive power, characterized in that said first lens unit comprises, in succession from the object side, at least one negative lens and a plurality of positive lenses, at least one positive lens LP is provided with a thin layer of resin, and when the Abbe's number of the material of said positive lens LP is defined as νp and the Abbe's number of the material of said resin is defined as νr, the thin layer of said resin satisfies $$\nu p - \nu r > 12 \tag{1}$$

and when the radius of curvature of that surface of the thin layer of said resin which is adjacent to the object side or the radius of curvature of a reference spherical surface is defined as r1a and the radius of curvature of a reference spherical surface of the thin layer of the resin which is adjacent to the image side is defined as r2a and the refractive index of the material of the resin is defined as N and the refractive power of the first lens unit is defined as $\phi 1$, the thin layer of the resin satisfies $$\phi/\phi 1 < -0.1, \tag{2}$$

where $$\phi = (N-1)(1/r1a - 1/r2a).$$

By "reference spherical surface" is here meant a spherical surface which is defined such that a portion at the effective diameter of a surface concerned and a portion at the optical axis coincide with those of the surface concerned.

The zoom lens of the present invention is particularly characterized in that when the maximum effective radius of the positive lens LP is defined as hmax and the maximum incidence height in an off-axis light beam of a maximum angle of view at the wide-angle end thereof is defined as hw and the variable power (zooming) ratio thereof is defined as Z and the focal length of the wide-angle end is defined as fw and the maximum incidence height in the off-axis light beam of the maximum angle of view at a focal length fm (=fw× $Z^{1/4}$) is defined as hz, the positive lens LP satisfies $$hw/hmax > 0.7 \tag{3}$$

or $$hz/hmax > 0.7 \tag{4}$$

DESCRIPTION OF THE PREFERRED EMBODIMENTS

Figure 1:
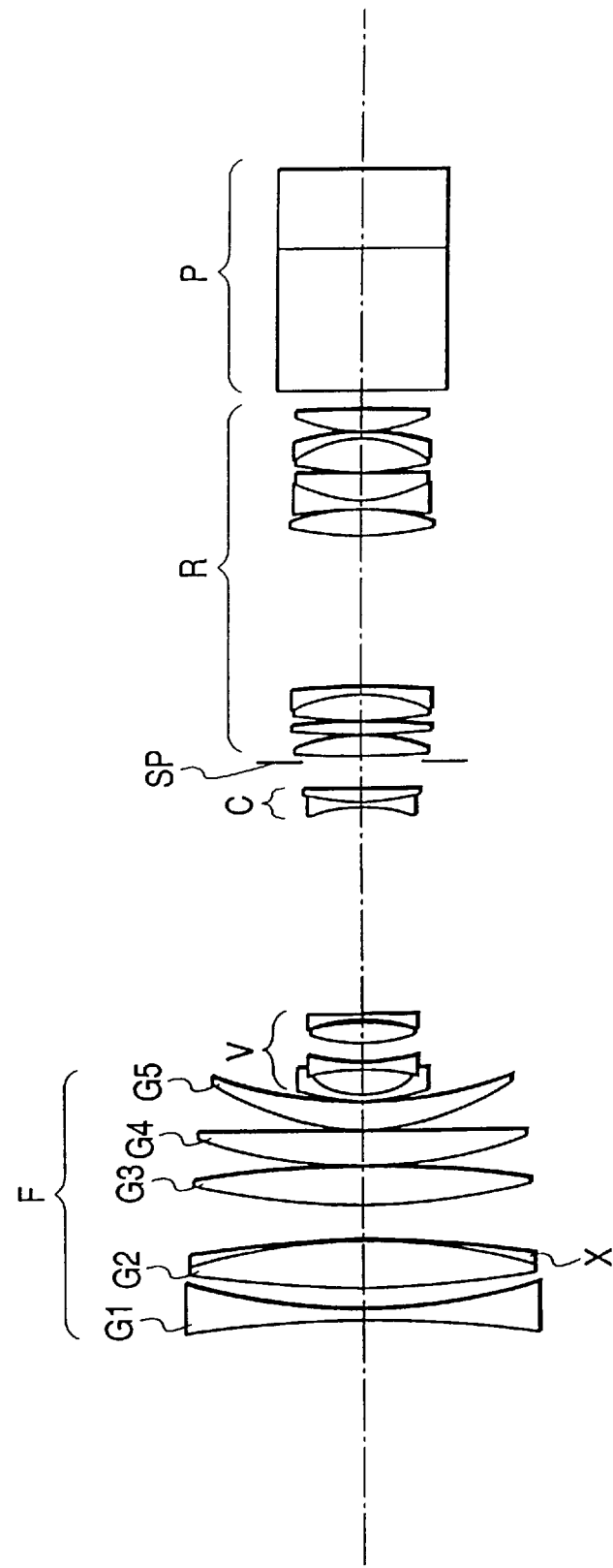
FIG. 1 is a lens cross-sectional view of the wide-angle end in Numerical Embodiment 1 of the present invention.
Figure 2:
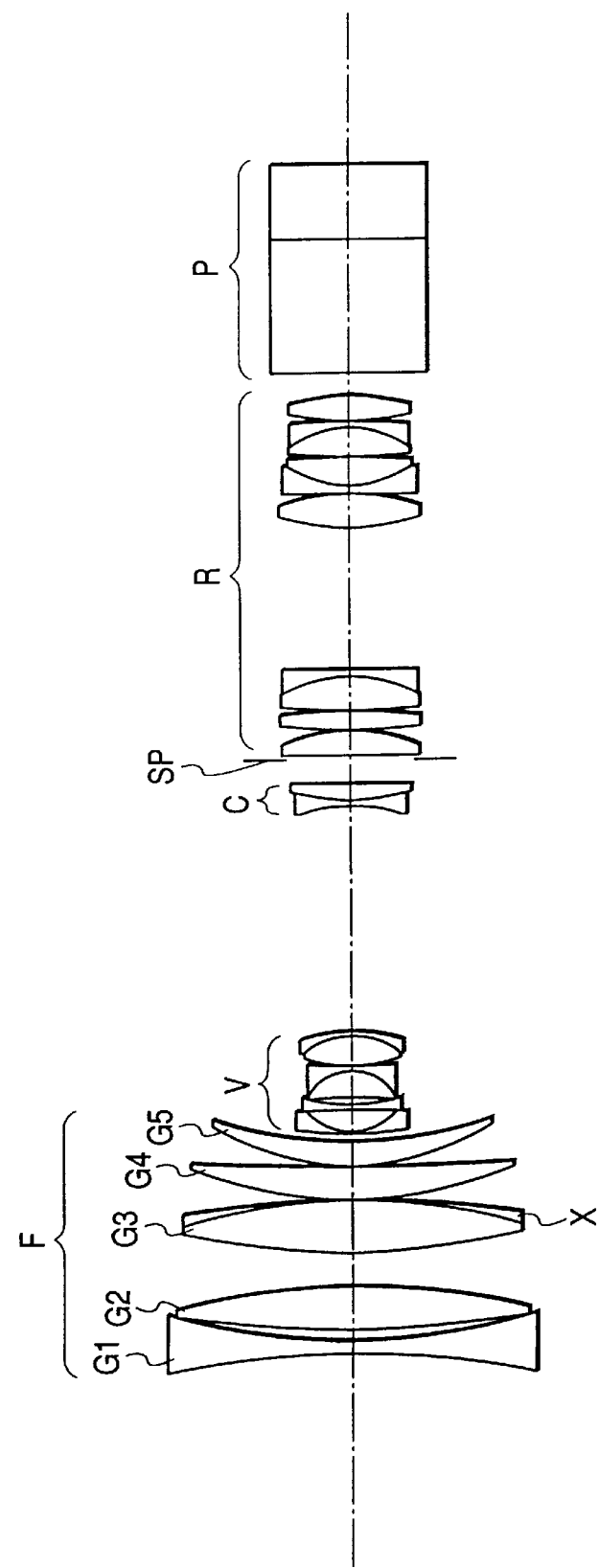
FIG. 2 is a lens cross-sectional view of the wide-angle end in Numerical Embodiment 2 of the present invention.
Figure 3:
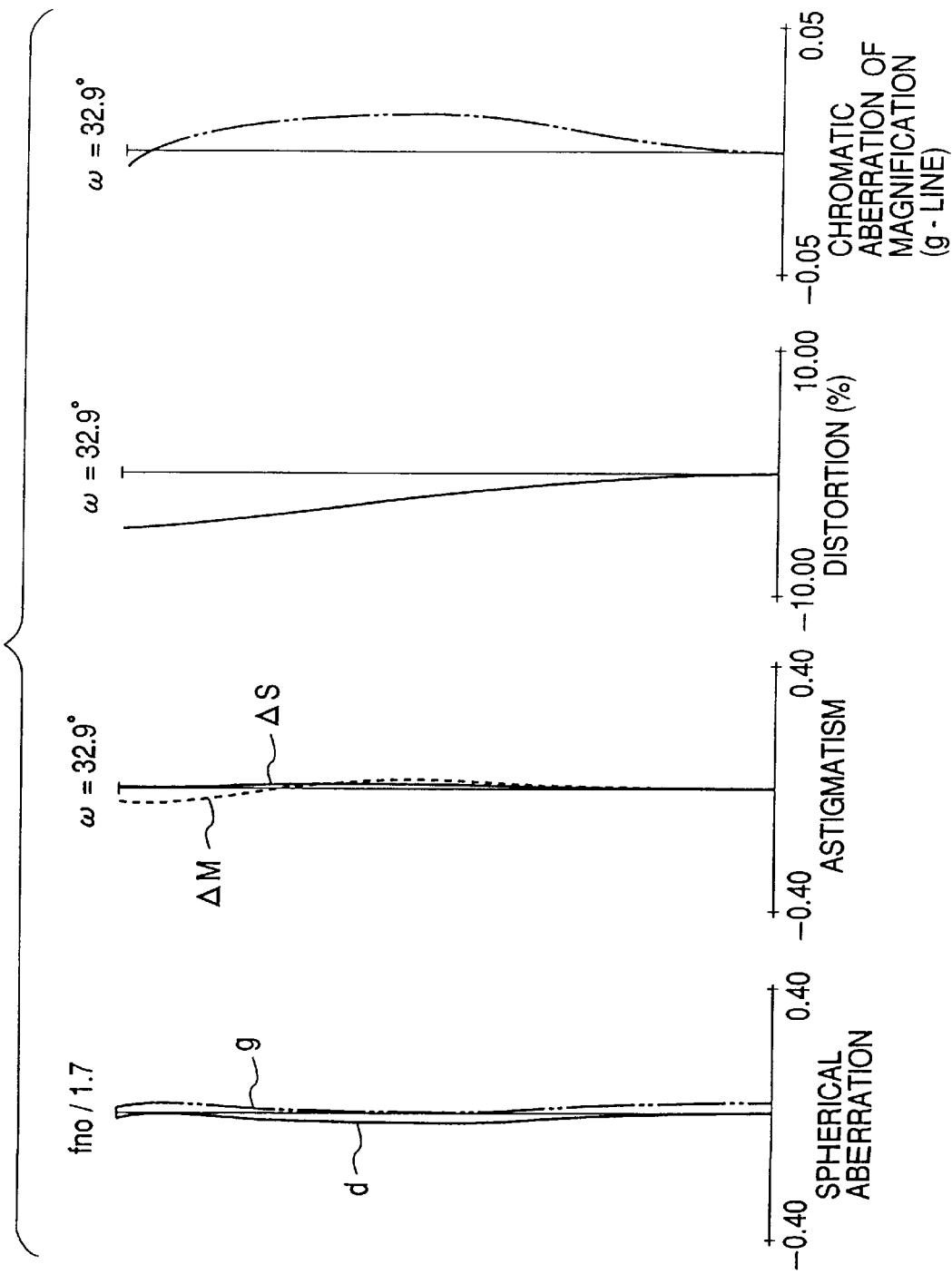
FIG. 3 shows the aberrations in Numerical Embodiment 1 of the present invention at a focal length f=8.5.
Figure 4:
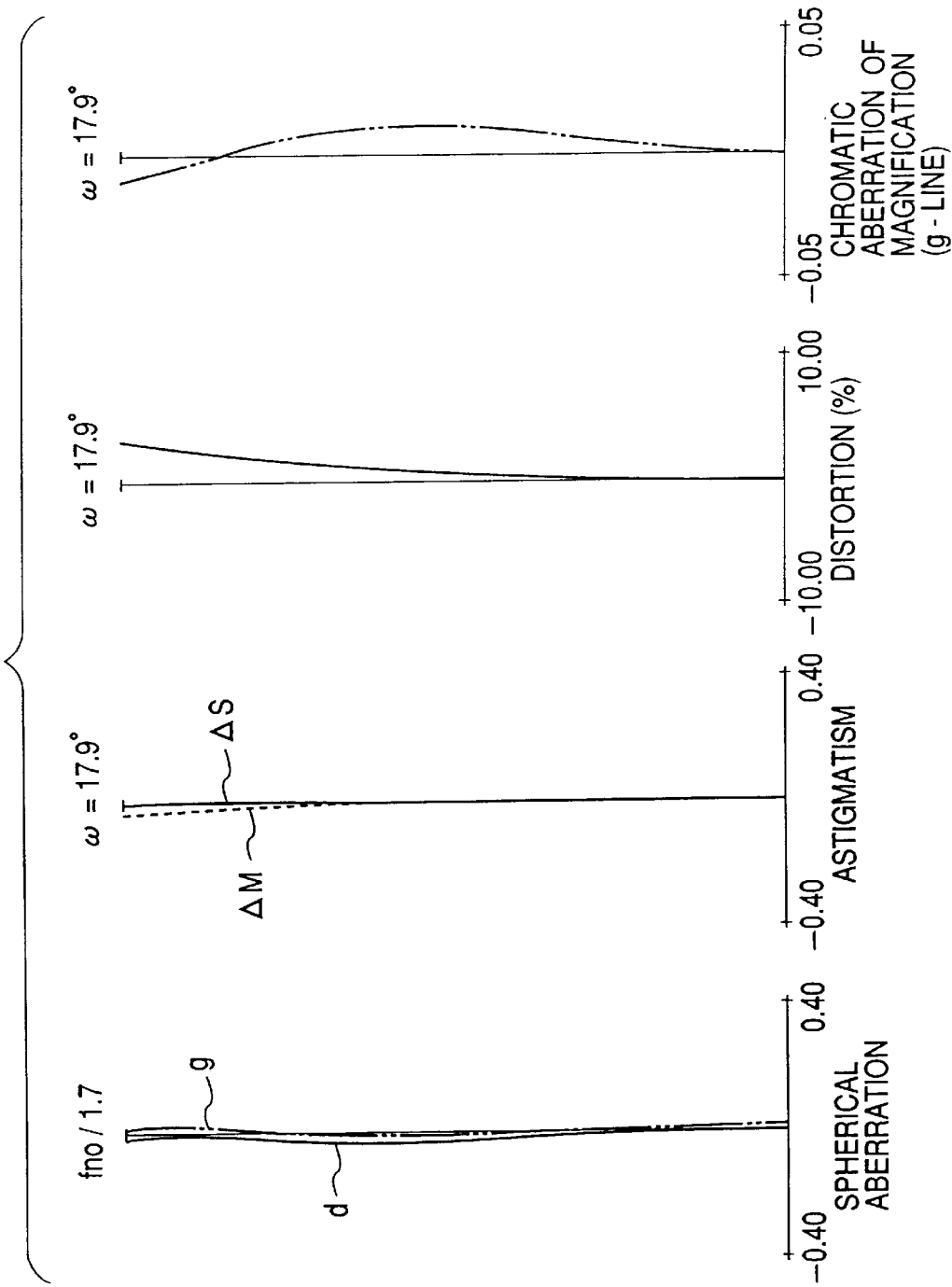
FIG. 4 shows the aberrations in Numerical Embodiment 1 of the present invention at the focal length f=17.0.
Figure 5:
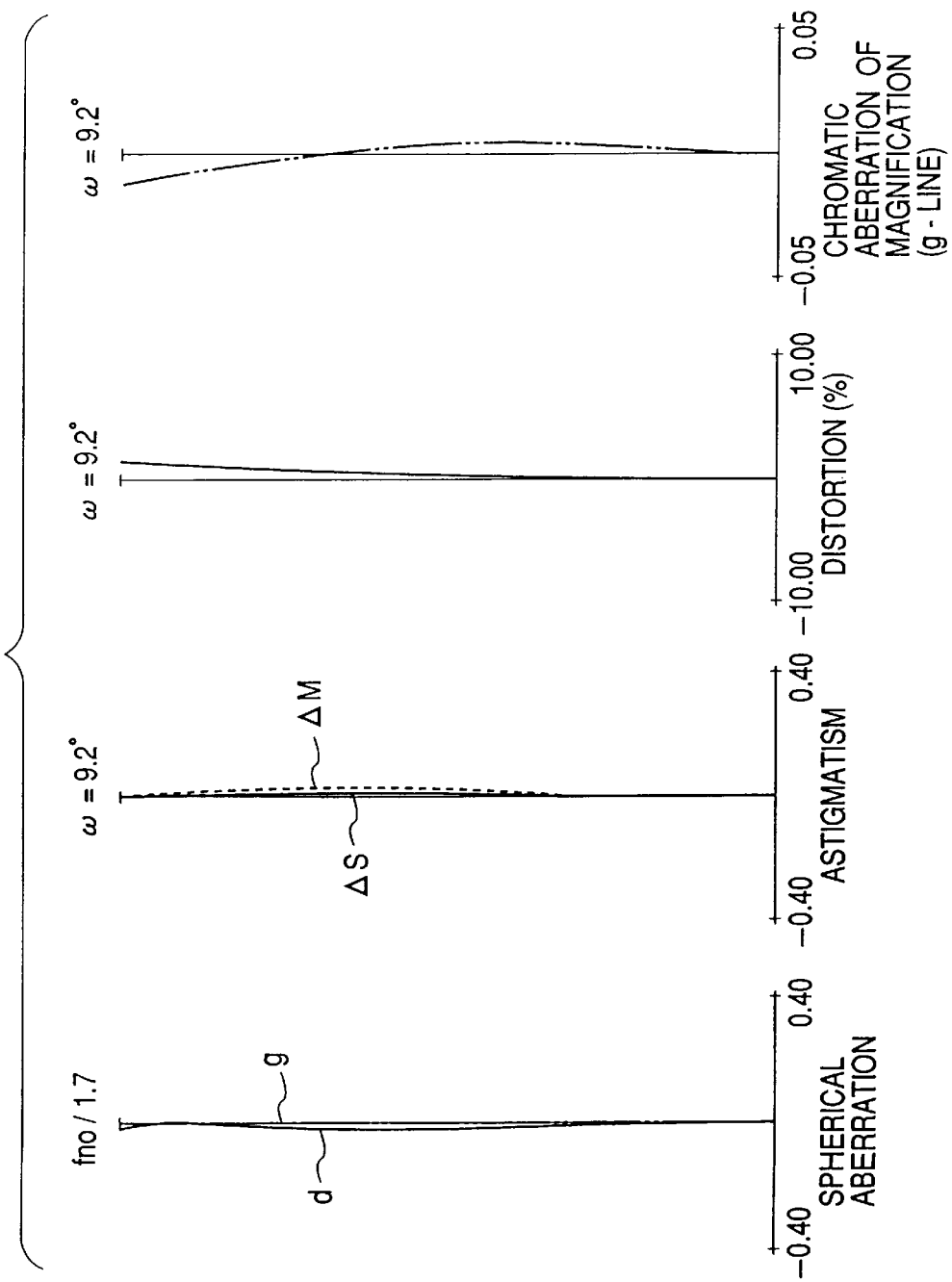
FIG. 5 shows the aberrations in Numerical Embodiment 1 of the present invention at the focal length f=34.0.
Figure 6:
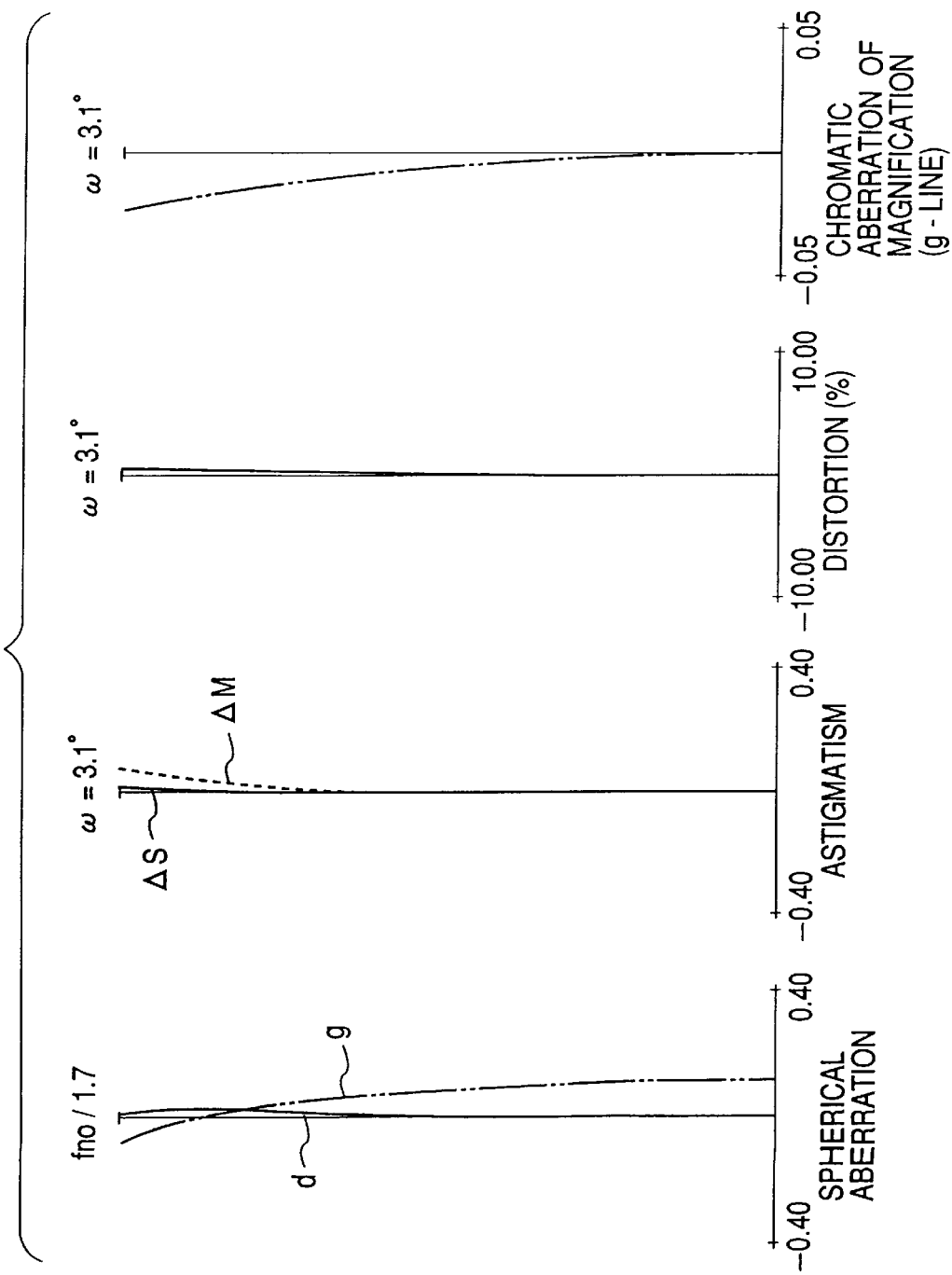
FIG. 6 shows the aberrations in Numerical Embodiment 1 of the present invention at the focal length f=102.9.
Figure 7:
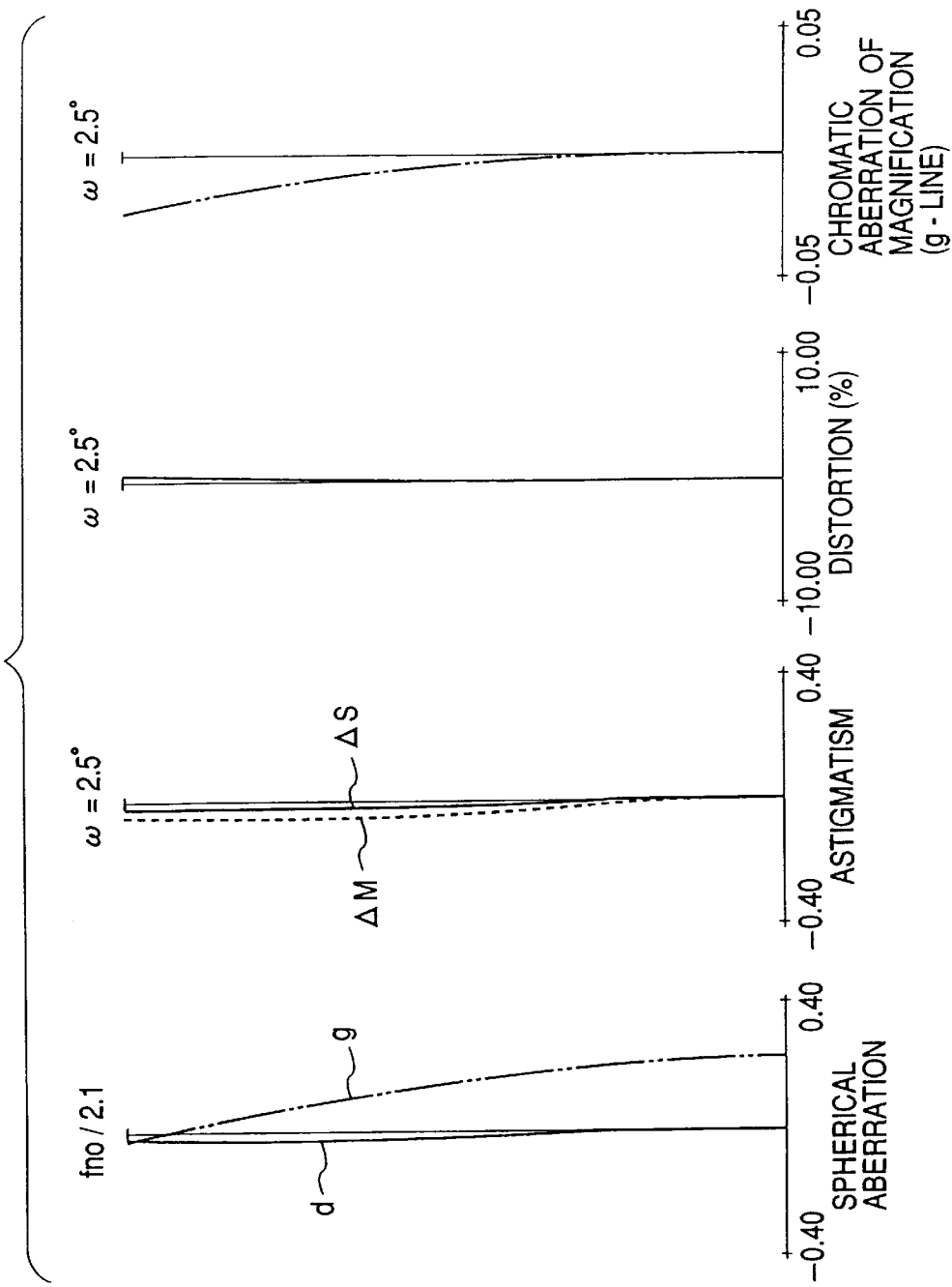
FIG. 7 shows the aberrations in Numerical Embodiment 1 of the present invention at the focal length f=127.5.
Figure 8:
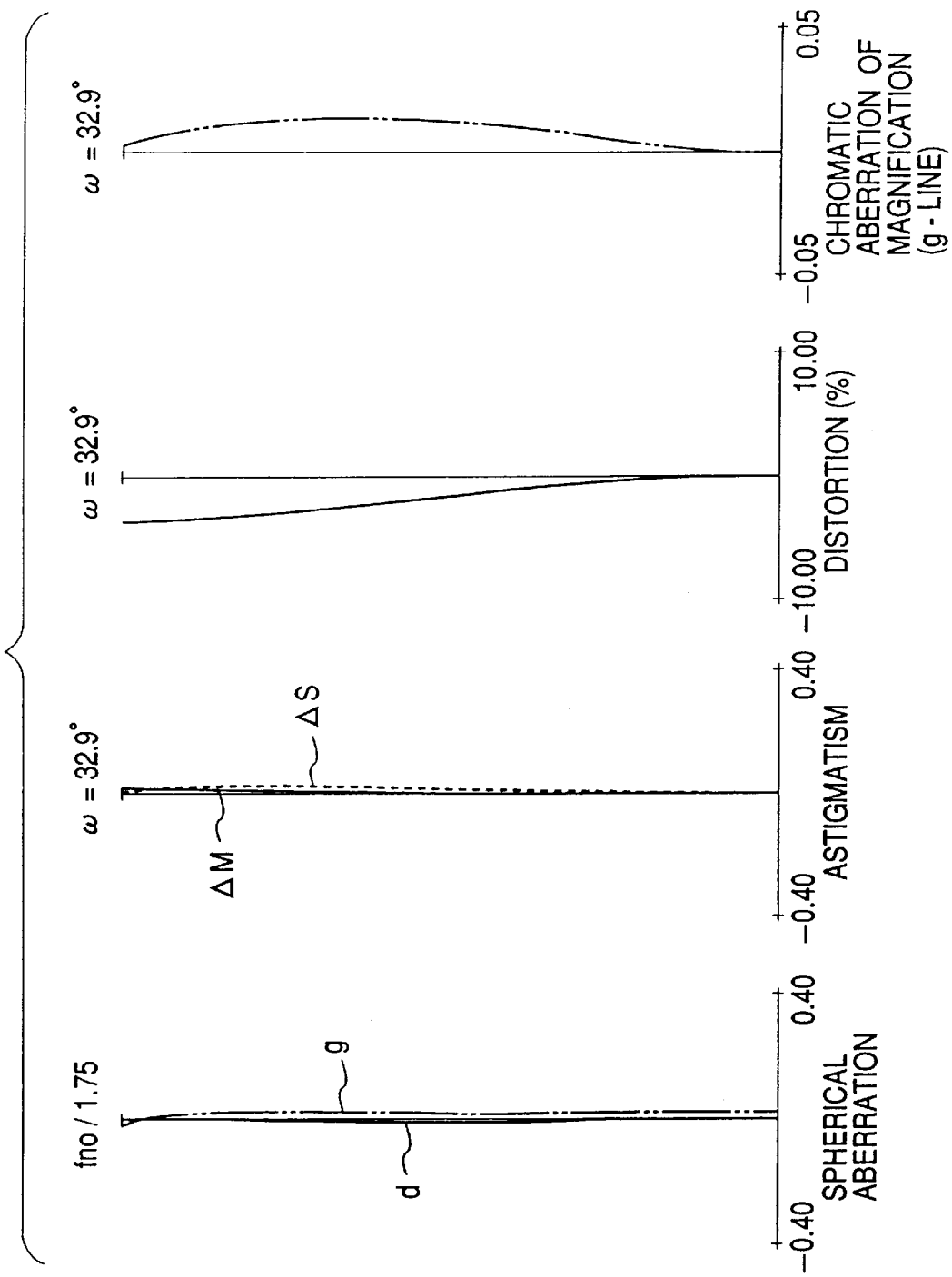
FIG. 8 shows the aberrations in Numerical Embodiment 2 of the present invention at the focal length f=8.5.
Figure 9:
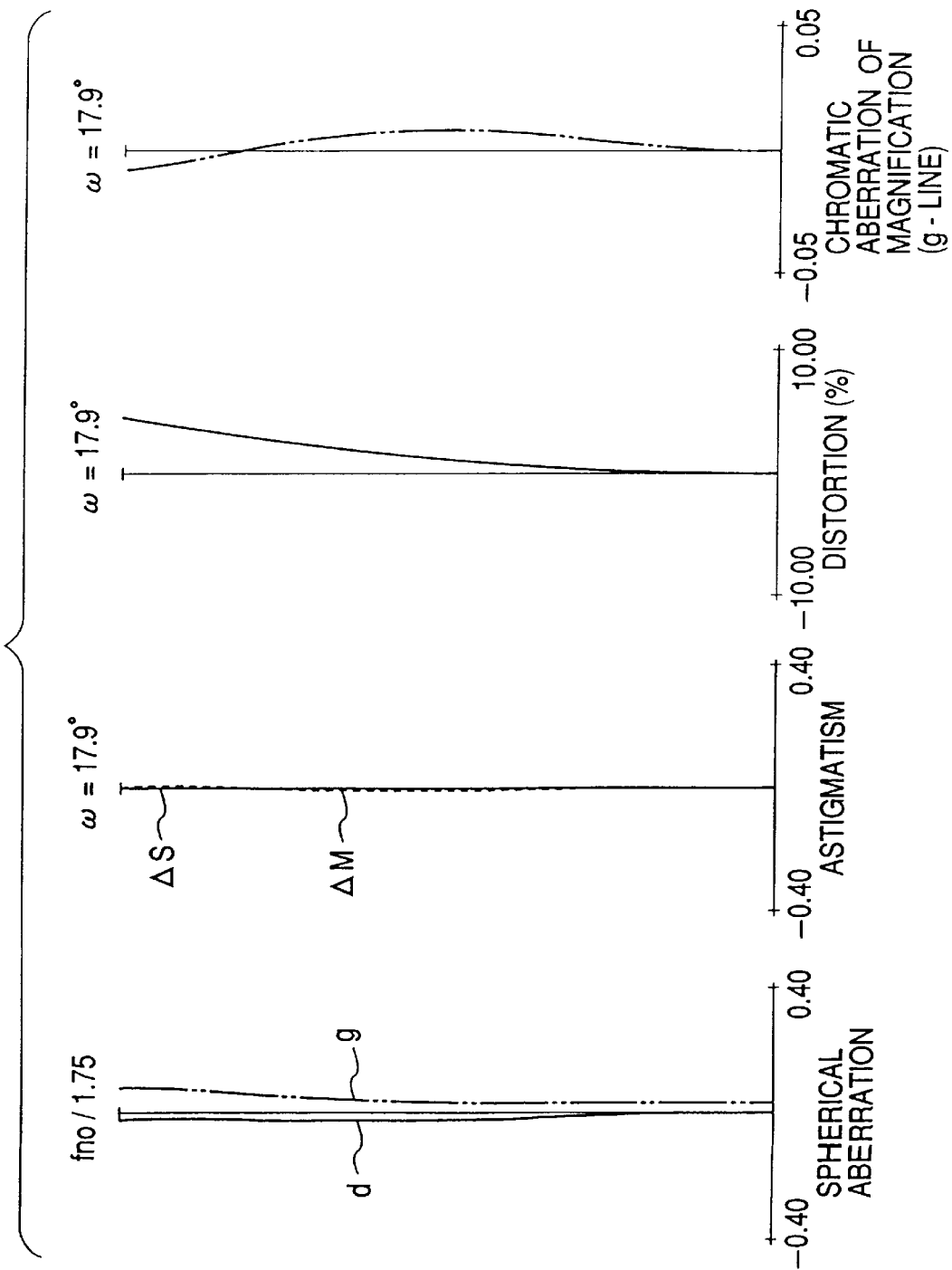
FIG. 9 shows the aberrations in Numerical Embodiment 2 of the present invention at the focal length f=17.0.
Figure 10:
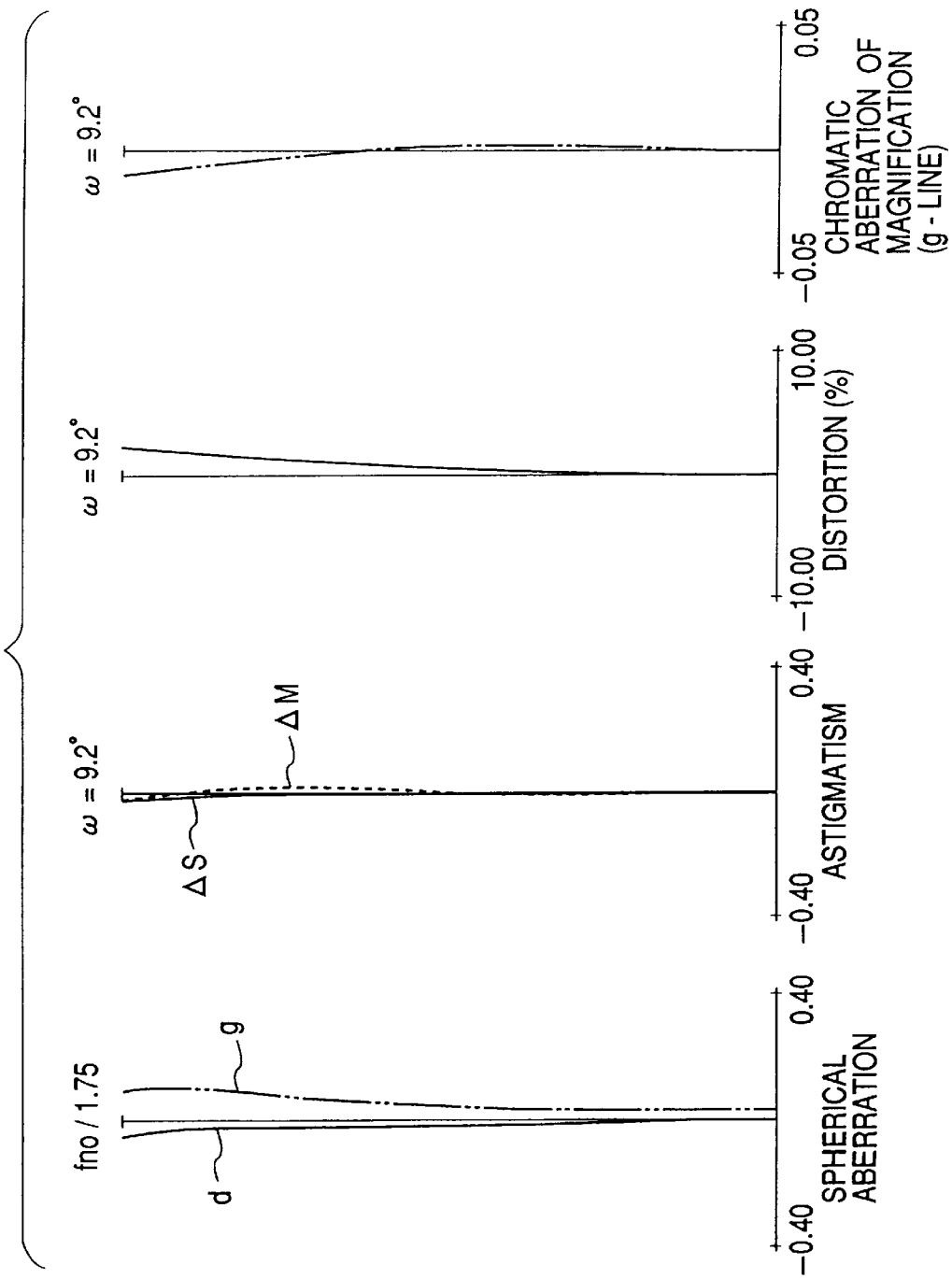
FIG. 10 shows the aberrations in Numerical Embodiment 2 of the present invention at the focal length f=34.0.
Figure 11:
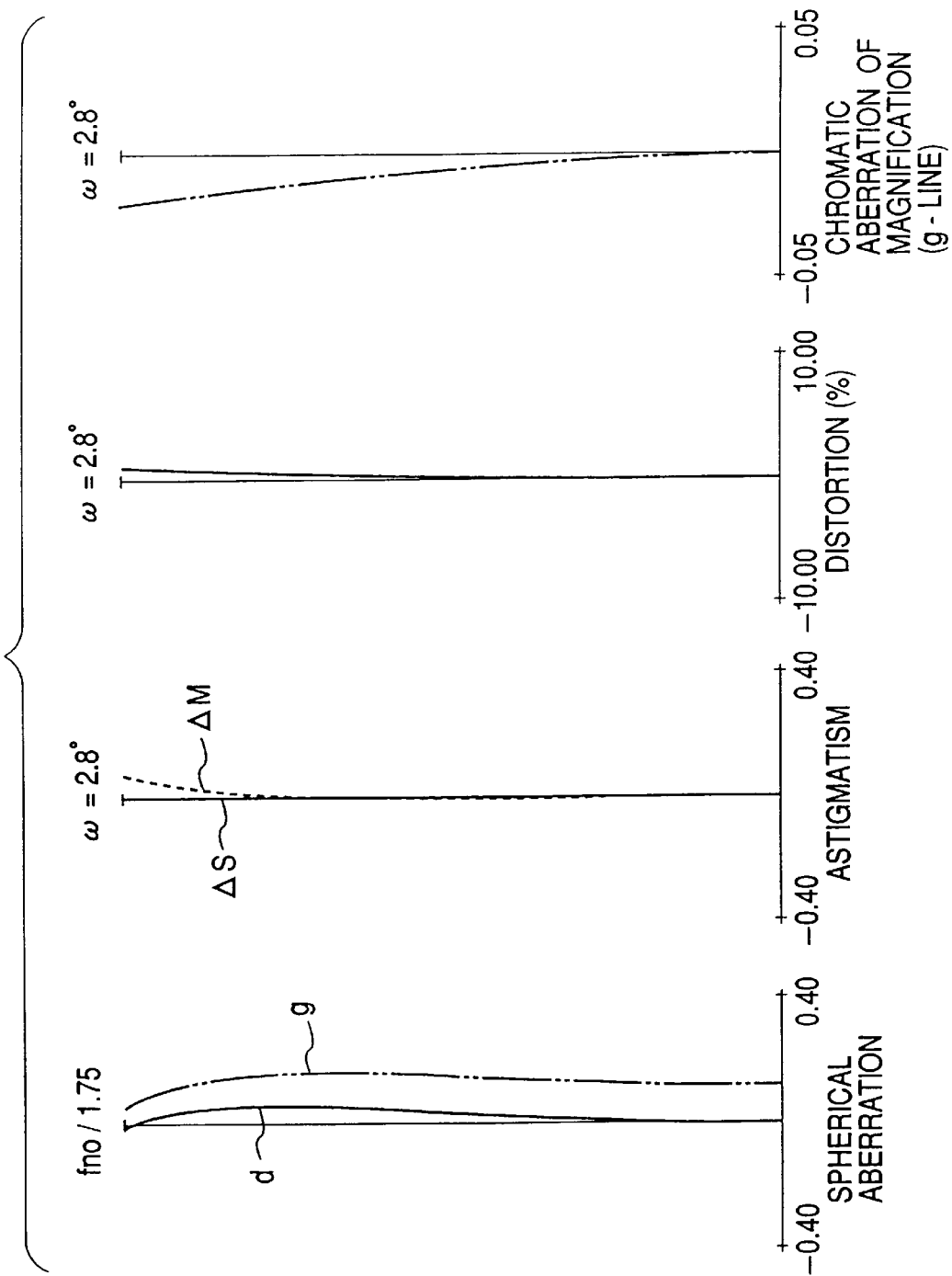
FIG. 11 shows the aberrations in Numerical Embodiment 2 of the present invention at the focal length f=110.5.
Figure 12:
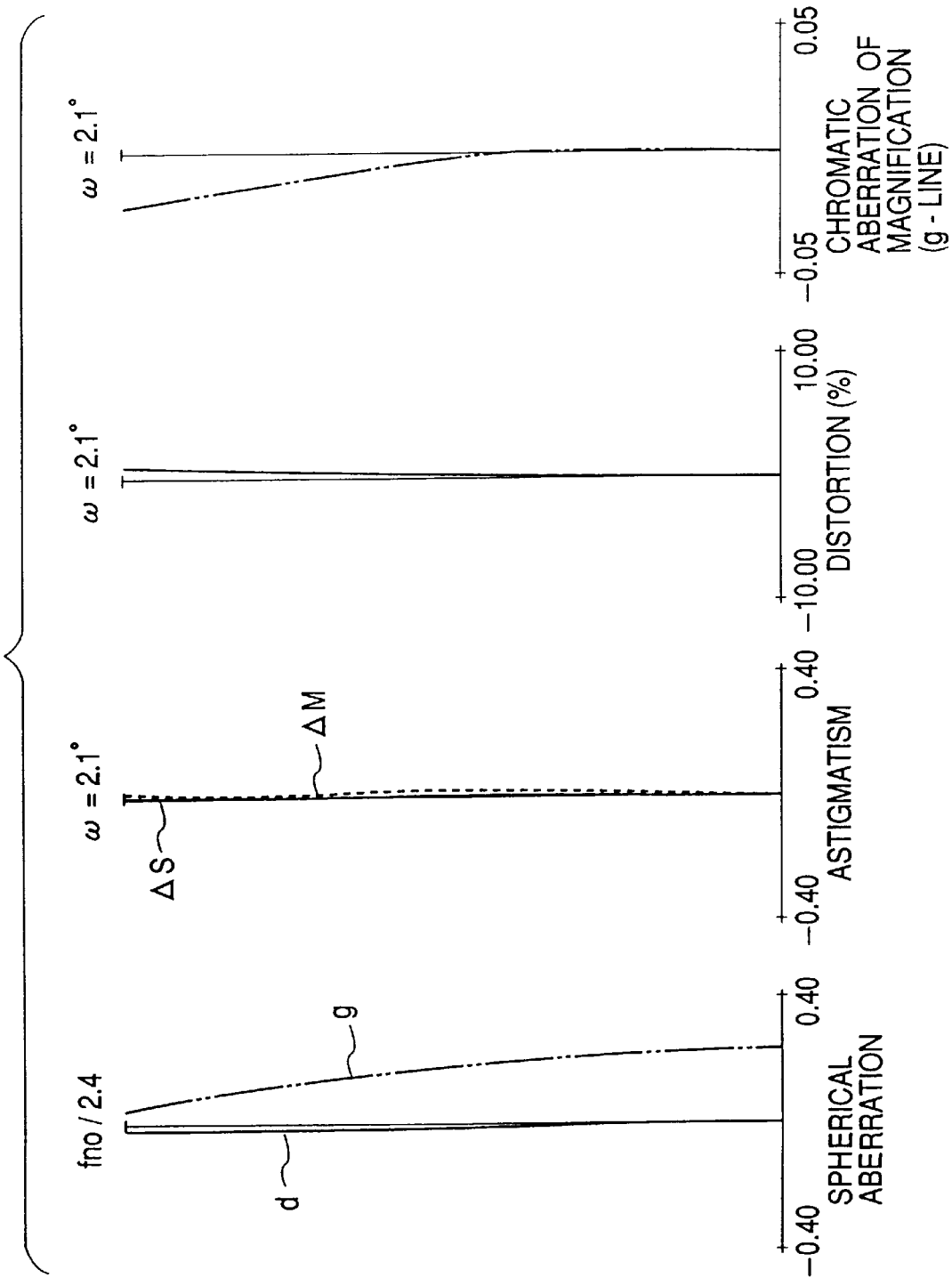
FIG. 12 shows the aberrations in Numerical Embodiment 2 of the present invention at the focal length f=153.0.
Figure 13:
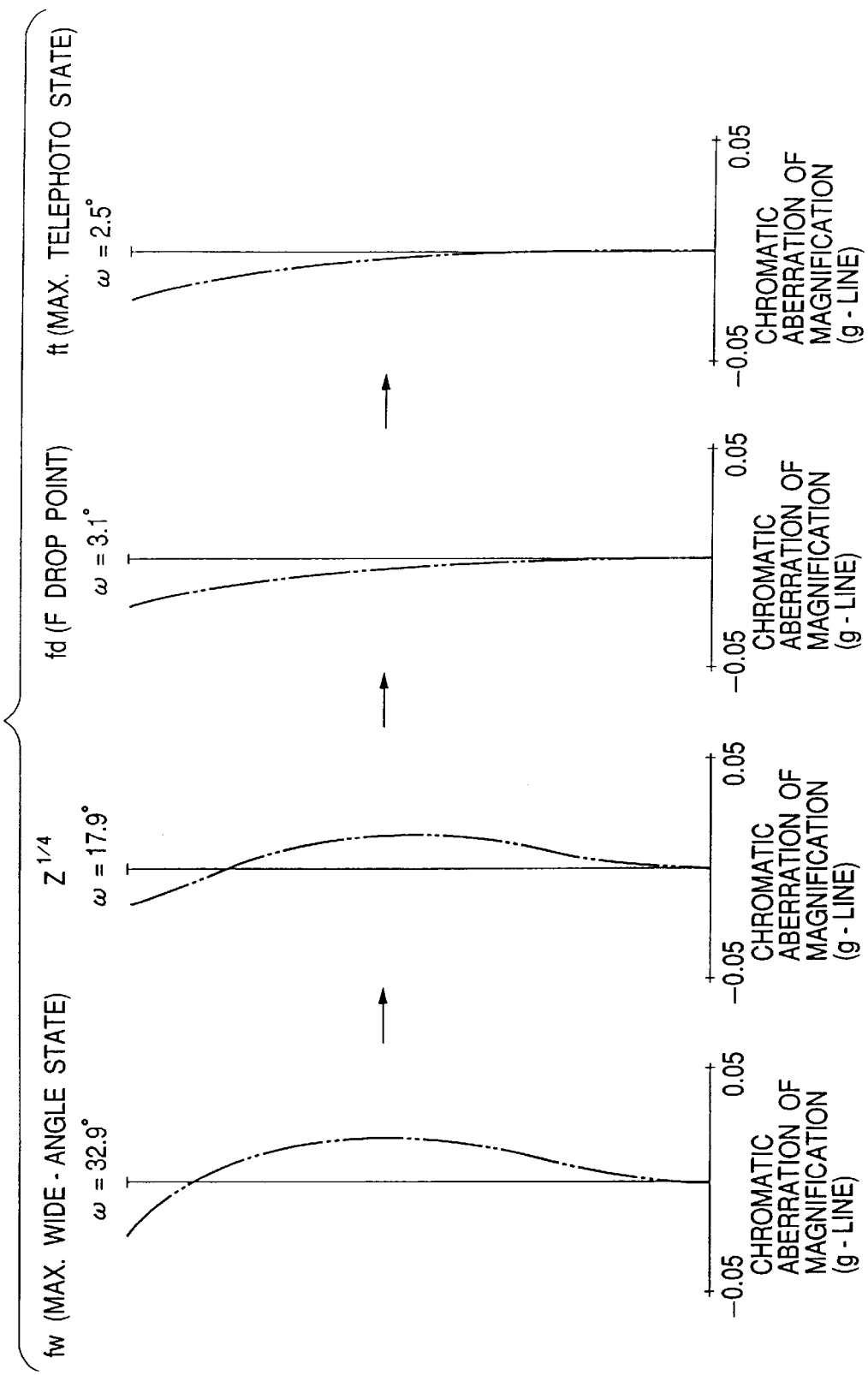
FIG. 13 shows the zoom changes of the chromatic aberration of magnification in a conventional four-unit zoom lens.

FIGS. 1 and 2 are lens cross-sectional views of Embodiments 1 and 2 of the present invention at the wide-angle ends thereof.

In FIGS. 1 and 2, the letter F designates a focusing lens unit (front lens unit) of positive refractive power as a first lens unit. The letter V denotes a variator of negative refractive power for zooming as a second lens unit, and it is monotonously moved on the optical axis thereof toward the image plane side to thereby effect zooming from the wide-angle end (maximum wide-angle state) to the telephoto end (maximum telephoto state). The letter C designates a compensator of negative refractive power as a third lens unit, and it is non-rectilinearly moved on the optical axis with a locus convex toward the object side to correct the fluctuation of the image plane resulting from focal length change. The third lens unit C may be constructed of positive refractive power. The variator V and the compensator C together constitute a focal length changing system (zooming system). SP denotes a stop, and the letter R designates a fixed relay lens unit of positive refractive power as a fourth lens unit. The letter P denotes a color resolving prism, an optical filter or the like, and in FIGS. 1 and 2, it is shown as a glass block.

In Numerical Embodiment 1 of FIG. 1, a thin layer X of resin is provided on that lens surface of a second positive lens G2 having both convex lens surfaces in the first lens unit F which is adjacent to the image plane. In Numerical Embodiment 2 of FIG. 2, a thin layer X of resin is provided on that lens surface of a third positive lens G3 having both convex lens surfaces in the first lens unit F which is adjacent to the image plane.

Description will now be made of the features of the thin layer X of resin provided on the lens surface of the zoom lens according to the present embodiment.

Figure 14:
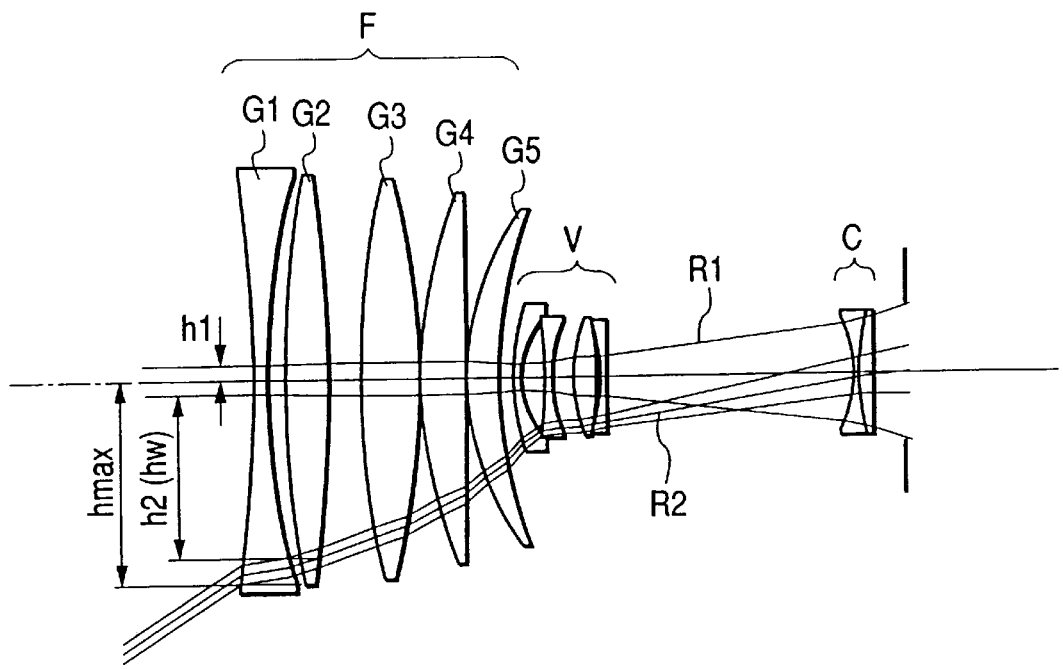
FIG. 14 shows the optical path of a portion of the conventional four-unit zoom lens.
Figure 15:
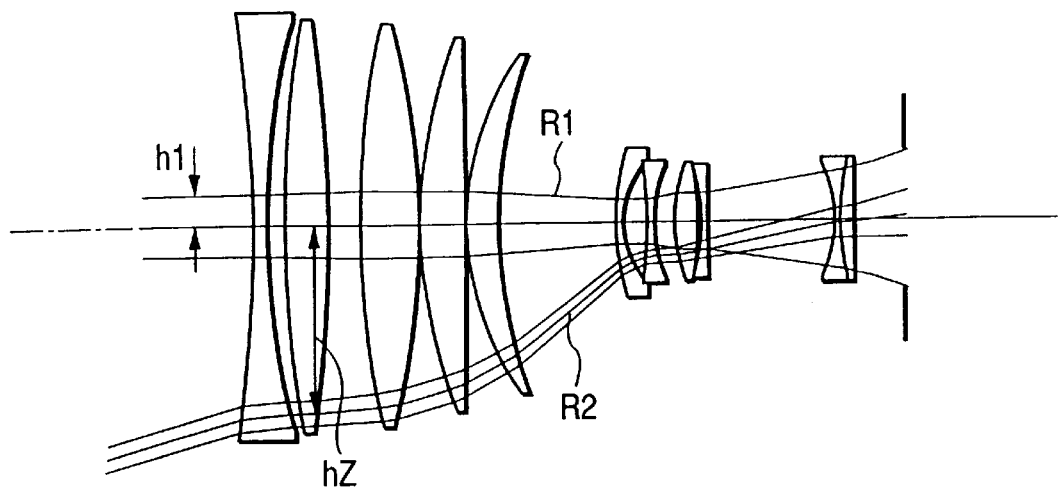
FIG. 15 shows the optical path of a portion of the conventional four-unit zoom lens.
Figure 16:
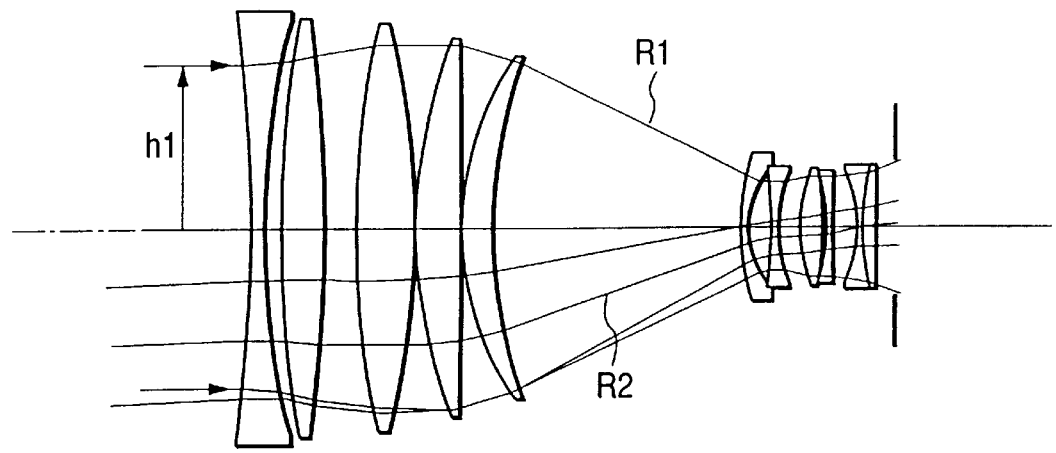
FIG. 16 shows the optical path of a portion of the conventional four-unit zoom lens.
Figure 17:
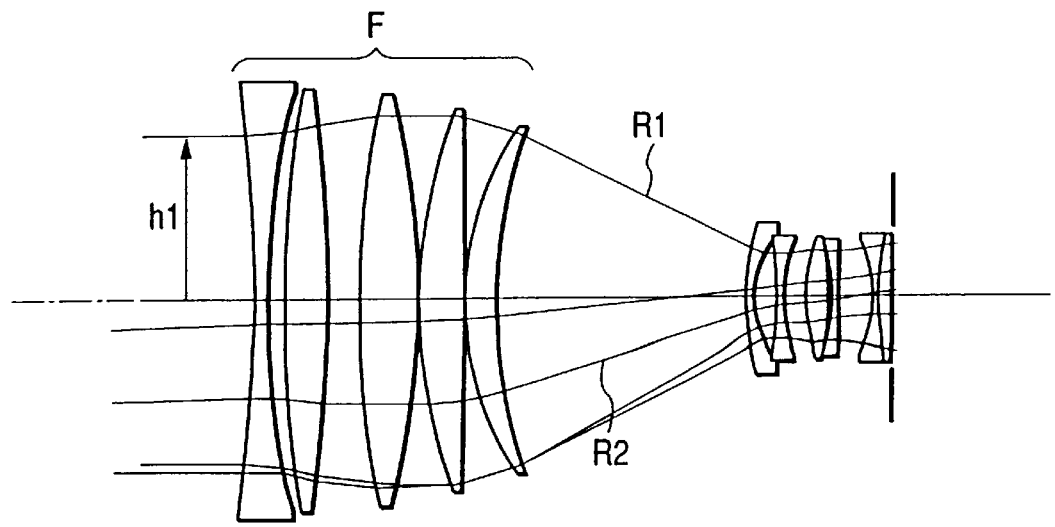
FIG. 17 shows the optical path of a portion of the conventional four-unit zoom lens.

In a zoom lens wherein the angle of view at the wide-angle end begins with 2ω=58° to 70° and the zoom ratio is of the order of 12 to 35 times, the incidence height h1 of an off-axial marginal ray R1 onto the first lens unit F becomes sequentially higher from the wide-angle end to the telephoto end as shown in FIGS. 14 to 17, and in a zoom lens having F drop, the incidence height hi becomes highest at an F drop starting position (zoom position focal length fd, FIG. 16). The incidence height hl becomes constant in the first lens unit F because of the F drop from the focal length fd to the telephoto end.

In contrast, the incidence height h2 of an off-axial ray (principal ray) R2 passes a high position in front of the first lens unit F at the wide-angle end of FIG. 14, but in the zoom position of a variable power ratio $Z^{1/4}$ of FIG. 15, the incidence height suddenly becomes high in the entire area of the first lens unit F. This tendency becomes remarkable when a wider angle, a higher magnification and compactness and lighter weight are aimed at.

So, in the present embodiment, in order to correct chromatic aberration of magnification which affects with the tangent of the incidence height h2 of the off-axial ray R2, the first lens unit F in which the off-axial ray R2 in the entire variable power range becomes highest is comprised, in succession from the object side, of at least one negative lens and three or more positive lenses, and a thin layer X of resin is provided on at least one positive lens surface of the lens surfaces constituting the first lens unit F which, when the maximum effective diameter is defined as hmax and the incidence height of the off-axial light beam of a maximum angle of view at the wide-angle end (FIG. 14) is defined as hw and the zoom position focal length at a variable power ratio $Z^{1/4}$ is defined as fm (=fw×$Z^{1/4}$) and the incidence height of the off-axial light beam of a maximum angle of view in FIG. 15 is defined as hz, satisfies $$0.7 > hw/hmax \qquad (3)$$

or $$0.7 > hz/hmax \qquad (4)$$

By using a lens (optical element) provided with such a thin layer X of resin, the fluctuation of chromatic aberration of magnification by focal length changing is reduced and the entire variable power range is corrected well.

In the present embodiment, as a method of easily manufacturing a lens (optical element) provided with a thin layer X of resin, the technique of forming an aspherical surface on the surface of a spherical-surface-worked glass lens by the use of a thin layer of resin can be applied. If this technique is used, there is the feature that the center thickness of the thin layer of resin can be formed very thinly (several tens of μm As described above, a thin layer endowed with appropriate negative refractive power is formed by the use of resin which is small in Abbe's number relative to the positive lens, whereby it is endowed with the effect of achromatism without almost increasing the full length of the optical system. Acryl resin, epoxy resin, polycarbonate or the like can be applied as transparent resin used in the present embodiment.

Description will now be made of the technical meanings of the aforementioned conditional expressions (1) to (4).

Conditional expression (1) prescribes the upper limit of the Abbe's number vr of the material of said resin by the relation thereof with the Abbe's number of the material of said positive lens. Also, conditional expression (2) prescribes that the refractive power ϕ of the thin layer of said resin is negative, and prescribes the upper limit thereof by the relation thereof with the refractive power φ1 of the first lens unit. If conditional expressions (1) and (2) are not satisfied, the sharing of the achromatism of the thin layer of said resin in the first lens unit F will be deficient and the correction effect of chromatic aberration of magnification will become insufficient.

Also, the surface forming the thin layer of said resin is regulated into a surface concave toward the object side, whereby high-order chromatic aberration of magnification is corrected more effectively. Also, it is disposed on a condition satisfying conditional expression (1) and positive distortion is corrected more effectively by a focal length fm in the vicinity of the variable power ratio $Z^{1/4}$.

Conditional expressions (3) and (4) prescribe a position at which a thin layer of resin effective for the correction of chromatic aberration of magnification at the wide-angle side should be disposed. By the thin layer of resin being disposed at a position satisfying conditional expression (3), the correction effect of chromatic aberration of magnification near the wide-angle end can be maximized. If the thin layer of resin is disposed at a position satisfying conditional expression (4), the correction effect of chromatic aberration of magnification at the focal length fm in the vicinity of the variable power ratio $Z^{1/4}$ can be maximized. In addition, positive distortion which becomes maximum at the focal length fm in the vicinity of the variable power ratio $Z^{1/4}$ can be corrected effectively.

If one of conditional expressions (3) and (4) is not satisfied, the correction effect of chromatic aberration of magnification at the wide-angle side will become insufficient.

In Numerical Embodiments 1 and 2, the first lens unit is comprised, in succession from the object side, of a negative lens of which the both lens surfaces are concave surfaces, a positive lens of which the both lens surfaces are convex surfaces, a positive lens of which the both lens surfaces are convex surfaces, a positive lens having its convex surface facing the object side, and a meniscus-like positive lens having its convex surface facing the object side.

Thereby, the various aberrations are corrected well. Also, the thin layer of resin may be provided on a plurality of lens surfaces.

The features of each embodiment (numerical value embodiment) of the present invention will now be described.

Numerical Embodiment 1 shown in FIG. 1 has a zoom ratio of 15 times and the angle of view 2ω at the wide-angle end thereof exceeds 65°. Lens surfaces R12 to R11 (G1 to G5) together constitute a fore lens unit F for focusing having positive refractive power. Lens surfaces R12 to R19 together constitute a variator V monotonously moved from Wide (wide-angle end) to Tele (telephoto end) toward the image plane side for focal length change. Lens surfaces R20 to R22 together constitute a compensator C having the action of image point correction resulting from focal length change, and having negative power (refractive power) and moved during the focal length change from Wide to Tele so as to describe an arc convex toward the object side. SP(23) is a stop. Lens surfaces R24 to R40 together constitute a relay lens unit R having the imaging action, and R41 to R43 together constitute a glass block equivalent to a color resolving prism.

The fore lens unit comprises, in succession from the object side, five lenses, i.e., negative, positive, positive, positive and positive lenses, and diffuses spherical aberration by the negative lens, and suppresses the creation of spherical aberration in the fore lens unit F.

A thin layer X of resin in the fore lens unit F is provided on the lens surface R4. As the material of the resin, use is made of PMMA (polymethyl methacrylate resin).

In the present embodiment, the thin layer X of said resin is disposed on the positive lens satisfying conditional expressions (3) and (4). Accordingly, it is given appropriate negative refractive power and is. made to share achromatism to thereby mitigate the creation of high-order chromatic aberration of magnification in the wide-angle end to the wide-angle area of a focal length in the vicinity of the variable power ratio $Z^{1/4}$, and a thin layer X of said resin is further disposed on a lens surface concave toward the object side to thereby effectively correct the high-order component of chromatic aberration of magnification. The center thickness of the thin layer X of said resin is as small as 0.02 mm and therefore scarcely contributes to the full length of the first lens unit. As described above, in the present embodiment, the lens surfaces to be provided with the thin layer X of resin are appropriately set to thereby well correct the chromatic aberration of magnification at the wide-angle side without causing the bulkiness and increased weight of the zoom lens, and obtain high optical performance in the entire variable power range.

The values of conditional expressions (1) to (4) in the present embodiment will be shown below.

$\nu p - \nu r = 24.2$ (1)

$\phi/\phi 1 = -0.107$ (2)

$hw/hmax = 0.871$ (3)

$hz/hmax = 0.927$ (4)

FIGS. 3 to 7 show spherical aberration, astigmatism, distortion and chromatic aberration of magnification at respective zoom positions. Also, in the present embodiment, the value of conditional expression (1) is 24.2, but by using combination of materials in which the difference in dispersion between a material of the positive lens and a material of resin is made greater, the better correction effect of chromatic aberration of magnification can be obtained. In the present embodiment, the thin layer X of resin is formed as a spherical surface, but by making it into an aspherical surface, it is easy to increase the degree of freedom of aberration correction and achieve a further improvement in performance.

Numerical Embodiment 2 shown in FIG. 2 has a zoom ratio of 18 times and the angle of view 2ω at the wide-angle end thereof exceeds 65°. Lens surfaces R1 to R121 (G1 to G5) together constitute a fore lens unit F for focusing having positive refractive power. Lens surfaces R12 to R21 together constitute a variator V monotonously moved from Wide (wide-angle end) to Tele (telephoto end) toward the image plane side for zooming. Lens surfaces R22 to R24 together constitute a compensator C having the action of image point correction resulting from zooming and having negative power (refractive power) and moved during the zooming from Wide to Tele so as to describe an arc convex toward the object side. SP (25) is a stop. Lens surfaces R26 to R42 together constitute a relay lens unit R having the imaging action, and lens surfaces R43 to R45 together constitute a glass block equivalent to a color resolving prism.

The fore lens unit comprises, in succession from the object side, five lenses, i.e., negative positive, positive, positive and positive lenses, and diffuses spherical aberration by the negative lens, and suppresses the creation of spherical aberration in the fore lens unit F.

A thin layer X of resin in the fore lens unit F is provided on the lens surface R6, and satisfies conditional expression (4). As the material of the resin, use is made of PMMA (polymethyl methacrylate resin).

This thin layer X of resin is given appropriate negative refractive power and is made to share achromatism to thereby mitigate the chromatic aberration of magnification in the vicinity of the maximum angle of view suddenly changing to minus in the wide angle area of the focal length fm in the vicinity of the variable power ratio $Z^{1/4}$, and well correct the balance of the chromatic aberration of magnification. Further, in the present embodiment, the positive lens provided with the thin layer X of resin is such that the value of conditional expression (3) is 0.646 which does not satisfy the condition, whereas the value of conditional expression (4) is 0.874 which satisfies the condition, and from the wide-angle end to the focal length fm of the variable power ratio $Z^{1/4}$, the off-axial light beam is at a position in which it suddenly becomes high. By providing a thin layer X of resin having negative refractive power at such a position, chromatic aberration of magnification is mitigated from changing toward the minus side from the wide-angle end to the variable power ratio $Z^{1/4}$. Also, the center thickness of the thin layer X of resin is as small as 0.02 mm and therefore scarcely contributes to the full length of the first lens unit.

As described above, in the present embodiment, the lens surface to be provided with the thin layer X of resin is appropriately set to thereby well correct the chromatic aberration of magnification at the wide-angle side without causing the bulkiness and increased weight of the zoom lens, and obtain high optical performance in the entire variable power range.

The values of the respective conditional expressions in the present embodiment will be shown below.

$$\nu p - \nu r = 24.2 \quad (1)$$

$$\phi/\phi 1 = -0.106 \quad (2)$$

$$hw/hmax = 0.646 \quad (3)$$

$$hz/hmax = 0.874 \quad (4)$$

FIGS. 8 to 12 show spherical aberration, astigmatism, distortion and chromatic aberration of magnification at respective zoom positions. Also, in the present embodiment, the value of conditional expression (1) is 24.2, but by making the difference in Abbe's number between the positive lenses and the resin into a combination of greater values, the better correction effect of chromatic aberration of magnification can be obtained. In the present embodiment, the thin layer X of resin is formed as a spherical surface, but by making it into an aspherical surface, it is easy to increase the degree of freedom of aberration correction and achieve a further improvement in performance.

The numerical embodiments of the present invention will be shown below. In the numerical embodiments, ri represents the radius of curvature of the ith lens surface counted in order from the object side, di represents the thickness and air space of the ith lens from the object side, and ni and ri represent the refractive index and Abbe's number, respectively, of the glass of the ith lens from the object side for d-line. In the numerical value embodiments, the last three lens surfaces are a glass block such as a face plate or a filter.

Numerical Value Embodiment 1 f = 8.5    fno = 1:1.7    2ω = 65.8

| | | | |
|---|---|---|---|
| r1 = −246.104 | d1 = 2.48 | n1 = 1.81265 | ν1 = 25.4 |
| r2 = 146.210 | d2 = 4.05 | | |
| r3 = 228.984 | d3 = 9.98 | n2 = 1.49845 | ν2 = 81.6 |
| r4 = −120.931 | d4 = 0.02 | n3 = 1.49375 | ν3 = 57.4 |
| r5 = −204.283 | d5 = 7.28 | | |
| r6 = 151.904 | d6 = 7.88 | n4 = 1.43496 | ν4 = 95.1 |
| r7 = −233.073 | d7 = 0.15 | | |
| r8 = 102.100 | d8 = 7.44 | n5 = 1.60520 | ν5 = 65.5 |
| r9 = −1025.703 | d9 = 0.15 | | |
| r10 = 55.225 | d10 = 5.35 | n6 = 1.77621 | ν6 = 49.6 |
| r11 = 96.385 | d11 = variable | | |
| r12 = 41.750 | d12 = 0.89 | n7 = 1.88814 | ν7 = 40.8 |
| r13 = 15.602 | d13 = 5.58 | | |
| r14 = −45.024 | d14 = 0.79 | n8 = 1.82017 | ν8 = 46.6 |
| r15 = 29.861 | d15 = 4.07 | | |
| r16 = 31.483 | d16 = 4.45 | n9 = 1.85501 | ν9 = 23.9 |
| r17 = −47.397 | d17 = 0.67 | | |
| r18 = −31.095 | d18 = 0.79 | n10 = 1.77621 | ν10 = 49.6 |
| r19 = 163.033 | d19 = variable | | |
| r20 = −26.422 | d20 = 0.89 | n11 = 1.77621 | ν11 = 49.6 |
| r21 = 46.908 | d21 = 2.58 | n12 = 1.85501 | ν12 = 23.9 |
| r22 = −289.101 | d22 = variable | | |
| r23 = stop | d23 = 1.09 | | |
| r24 = 176.473 | d24 = 3.88 | n13 = 1.51977 | ν13 = 52.4 |
| r25 = −41.794 | d25 = 0.20 | | |
| r26 = 111.875 | d26 = 2.70 | n14 = 1.51977 | ν14 = 52.4 |
| r27 = −178.082 | d27 = 0.20 | | |
| r28 = 68.690 | d28 = 6.00 | n15 = 1.51977 | ν15 = 52.4 |
| r29 = −31.445 | d29 = 1.29 | n16 = 1.82017 | ν16 = 46.6 |
| r30 = −205.464 | d30 = 31.78 | | |
| r31 = 64.608 | d31 = 5.65 | n17 = 1.48915 | ν17 = 70.2 |
| r32 = −41.119 | d32 = 0.20 | | |
| r33 = −82.277 | d33 = 1.39 | n18 = 1.83932 | ν18 = 37.2 |
| r34 = 30.253 | d34 = 5.74 | n19 = 1.50349 | ν19 = 56.4 |
| r35 = −298.031 | d35 = 0.20 | | |
| r36 = 62.631 | d36 = 6.75 | n20 = 1.48915 | ν20 = 70.2 |
| r37 = −25.714 | d37 = 1.39 | n21 = 1.83932 | ν21 = 37.2 |
| r38 = −57.377 | d38 = 0.20 | | |
| r39 = 36.302 | d39 = 4.50 | n22 = 1.51314 | ν22 = 60.5 |
| r40 = −603.859 | d40 = 3.97 | | |
| r41 = ∞ | d41 = 30.00 | n23 = 1.60718 | ν23 = 38.0 |
| r42 = ∞ | d42 = 16.20 | n24 = 1.51825 | ν24 = 64.2 |
| r43 = ∞ | | | |

| Focal length variable spacing | 8.50 | 17.00 | 34.00 | 102.85 | 127.50 |
|---|---|---|---|---|---|
| d11 | 0.56 | 19.32 | 31.98 | 43.76 | 45.04 |
| d19 | 43.36 | 21.84 | 7.76 | 2.75 | 4.62 |
| d22 | 6.06 | 8.83 | 10.25 | 3.48 | 0.33 | hmax = 36.28
hw = 31.59
hz = 33.62
$r_1$ = −161.649
$r^2$ = −317.692

$\phi 1 = \dfrac{1}{63.962} = 0.0156$ (3) = hw/hmax = 0.871
(4) = hz/hmax = 0.927
(1) = 24.2
(2) = −0.107
νp = 81.6
νr = 57.4
N = 1.49375

Numerical Value Embodiment 2 f = 8.5    fno = 1:1.7    2ω = 65.8

| | | | |
|---|---|---|---|
| r1 = −211.327 | d1 = 2.70 | n1 = 1.76168 | ν1 = 27.5 |
| r2 = 165.094 | d2 = 1.83 | | |
| r3 = 223.938 | d3 = 9.62 | n2 = 1.49845 | ν2 = 81.6 |

-continued

Numerical Value Embodiment 2

| r4 = | −178.190 | d4 = | 7.32 | | | | |
|---|---|---|---|---|---|---|---|
| r5 = | 149.936 | d5 = | 11.41 | n3 = 1.49845 | v3 = 81.6 |
| r6 = | −161.649 | d6 = | 0.02 | n4 = 1.49375 | v4 = 57.4 |
| r7 = | −317.692 | d7 = | 0.15 | | |
| r8 = | 94.740 | d8 = | 7.45 | n5 = 1.62032 | v5 = 63.4 |
| r9 = | 711.225 | d9 = | 0.15 | | |
| r10 = | 60.635 | d10 = | 5.63 | n6 = 1.69979 | v6 = 55.5 |
| r11 = | 111.103 | d11 = | variable | | |
| r12 = | 81.759 | d12 = | 0.75 | n7 = 1.88814 | v7 = 40.8 |
| r13 = | 14.873 | d13 = | 5.17 | | |
| r14 = | −116.240 | d14 = | 0.75 | n8 = 1.82017 | v8 = 46.6 |
| r15 = | 36.597 | d15 = | 1.84 | | |
| r16 = | −92.474 | d16 = | 5.75 | n9 = 1.81265 | v9 = 25.4 |
| r17 = | −12.362 | d17 = | 0.75 | n10 = 1.82017 | v10 = 46.6 |
| r18 = | 136.216 | d18 = | 0.15 | | |
| r19 = | 32.019 | d19 = | 6.96 | n11 = 1.55099 | v11 = 45.8 |
| r20 = | −17.530 | d20 = | 0.80 | n12 = 1.88814 | v12 = 40.8 |
| r21 = | −38.546 | d21 = | variable | | |
| r22 = | −30.813 | d22 = | 0.90 | n13 = 1.77621 | v13 = 49.6 |
| r23 = | 39.257 | d23 = | 3.72 | n14 = 1.85501 | v14 = 23.9 |
| r24 = | −2104.110 | d24 = | variable | | |
| r25 = | stop | d25 = | 1.00 | | |
| r26 = | 6999.999 | d26 = | 5.18 | n15 = 1.70346 | v15 = 48.1 |
| r27 = | −36.209 | d27 = | 0.15 | | |
| r28 = | 112.314 | d28 = | 4.09 | n16 = 1.48915 | v16 = 70.2 |
| r29 = | −135.734 | d29 = | 0.15 | | |
| r30 = | 101.384 | d30 = | 7.93 | n17 = 1.48915 | v17 = 70.2 |
| r31 = | −31.204 | d31 = | 1.50 | n18 = 1.83932 | v18 = 37.2 |
| r32 = | −300.454 | d32 = | 32.00 | | |
| r33 = | 61.993 | d33 = | 7.40 | n19 = 1.48915 | v19 = 70.2 |
| r34 = | −54.186 | d34 = | 0.15 | | |
| r35 = | −29072.279 | d35 = | 1.50 | n20 = 1.80811 | v20 = 46.6 |
| r36 = | 25.246 | d36 = | 6.53 | n21 = 1.51977 | v21 = 52.4 |
| r37 = | −191.343 | d37 = | 0.15 | | |
| r38 = | 125.243 | d38 = | 6.39 | n22 = 1.48915 | v22 = 70.2 |
| r39 = | −27.787 | d39 = | 1.60 | n23 = 1.83932 | v23 = 37.2 |
| r40 = | −193.034 | d40 = | 0.15 | | |
| r41 = | 66.721 | d41 = | 5.55 | n24 = 1.48915 | v24 = 70.2 |
| r42 = | −47.359 | d42 = | 5.00 | | |
| r43 = | ∞ | d43 = | 30.00 | n25 = 1.60718 | v25 = 38.O |
| r44 = | ∞ | d44 = | 16.20 | n26 = 1.51825 | v26 = 64.2 |
| r45 = | ∞ | | | | |

| Focal length variable spacing | 8.50 | 17.00 | 34.00 | 110.50 | 153.00 |
|---|---|---|---|---|---|
| d11 | 1.10 | 21.90 | 35.67 | 48.62 | 50.50 |
| d21 | 50.85 | 27.20 | 11.62 | 3.37 | 5.55 |
| d24 | 5.46 | 8.31 | 10.12 | 5.41 | 1.37 | hmax = 38.16
hw = 24.64
hz = 33.37
$r_1 = -161.649$
$r_2 = -317.692$ $\phi 1 = \dfrac{1}{70.4} = 0.0142$ (3) = hw/hmax = 0.646
(4) = hz/hmax = 0.874
(1) = 24.2
(2) = −0.106
vp = 81.6
vr = 57.4
N = 1.49375

According to the present invention, as described above, there can be achieved a so-called four-unit zoom lens in which the lens construction of a first lens unit is appropriately set and a thin layer of resin is appropriately provided on at least one lens surface of the first lens unit to thereby reduce the fluctuations of various aberrations resulting from focal length change (zooming) without causing the bulkiness and increased weight of the zoom lens, and well correct high-order chromatic aberration of magnification particularly at the wide-angle side and which has F number of the order of 1.7 at the wide-angle end and has a wide angle (angle of view 2ω= about 58° to 70° at the wide-angle end) as well as a great aperture ratio and a high zooming ratio having a variable power ratio of the order of 12 to 35.

What is claimed is:

1. A zoom lens including, in succession from the object side, a first lens unit of positive refractive power fixed during zooming, a second lens unit of negative refractive power for zooming, a third lens unit for correcting the fluctuation of the image plane resulting from zooming, and a fixed fourth lens unit of positive refractive power, wherein said first lens unit comprises, in succession from the object side, at least one negative lens and a plurality of positive lenses, at least one positive lens LP is provided with a thin layer of resin, and when the Abbe's number of the material of said positive lens LP is defined as vp and the Abbe's number of the material of said resin is defined as vr, $$vp-vr>12$$

is satisfied, and when the radius of curvature of a reference spherical surface of the thin layer of said resin which is adjacent to the object side is defined as r1a and the radius of curvature of a reference spherical surface of the thin layer of said resin which is adjacent to the image side is defined as r2a and the refractive index of the material of said resin is defined as N and the refractive power of said first lens unit is defined as φ1, $$\phi/\phi 1 < -0.1,$$

where $$\phi=(N-1)(1/r1a-1/r2a),$$

is satisfied.

2. A zoom lens according to claim 1, wherein when the maximum effective radius of said positive lens LP is defined as hmax and the maximum incidence height in an off-axis light beam of a maximum angle of view at the wide-angle end is defined as hw and the variable power ratio is defined as Z and the focal length of the wide-angle end is defined as fw and the maximum incidence height in an off-axis light beam of a maximum angle of view at a focal length fm (=fw×$Z^{1/4}$) is defined as hz, the expression that $$hw/hmax>0.7$$

or $$hz/hmax>0.7$$

is satisfied.

3. A zoom lens according to claim 1, wherein the surface forming the thin layer of said resin is a concave surface relative to the object side.

4. A zoom lens according to claim 1, wherein said first lens unit comprises, in succession from the object side, a negative lens of which the two lens surfaces are concave surfaces, a positive lens of which the two lens surfaces are convex surfaces, a positive lens of which the two lens surfaces are convex surfaces, a positive lens having its convex surface facing the object side, and a meniscus-like positive lens having its convex surface facing the object side.

5. A zoom lens according to claim 4, wherein the thin layer of said resin is provided on that lens surface at the image plane side, of the second or third lens in said first lens unit as counted from the object side.

* * * * *

UNITED STATES PATENT AND TRADEMARK OFFICE
CERTIFICATE OF CORRECTION

PATENT NO. : 6,141,157  
DATED : October 31, 2000  
INVENTOR(S) : Ryuji Nurishi et al.

Page 1 of 1

It is certified that error appears in the above-identified patent and that said Letters Patent is hereby corrected as shown below:

Column 6,  
Line 5, delete "hi" and insert -- h1 --.  
Line 51, delete "µm" and insert -- µm). --.  
Line 63, delete "vr" and insert -- υr --.

Column 7,  
Line 45, delete "R12" and insert -- R1 --.

Column 8,  
Line 45, delete "R12" and insert -- R11 --.

Column 10,  
Line 49, delete "$r^2$" and insert -- $r_2$ --.

Signed and Sealed this

Eighteenth Day of December, 2001

Attest:

JAMES E. ROGAN  
Attesting Officer     Director of the United States Patent and Trademark Office